United States Patent
Tufvesson et al.

(10) Patent No.: US 12,345,881 B2
(45) Date of Patent: Jul. 1, 2025

(54) PROJECTION OF AN IMAGE IN AN EXTENDED REALITY DEVICE

(71) Applicant: Telefonaktiebolaget LM Ericsson (publ), Stockholm (SE)

(72) Inventors: Pex Tufvesson, Lund (SE); Carl Drougge, Malmö (SE); Anders Berkeman, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 206 days.

(21) Appl. No.: 18/023,507

(22) PCT Filed: Aug. 28, 2020

(86) PCT No.: PCT/EP2020/074157
§ 371 (c)(1),
(2) Date: Feb. 27, 2023

(87) PCT Pub. No.: WO2022/042859
PCT Pub. Date: Mar. 3, 2022

(65) Prior Publication Data
US 2024/0013480 A1    Jan. 11, 2024

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0172* (2013.01); *G06T 7/20* (2013.01);
(Continued)

(58) Field of Classification Search
None
See application file for complete search history.

(56) References Cited

U.S. PATENT DOCUMENTS

2012/0154277 A1   6/2012  Bar-Zeev et al.
2012/0293407 A1  11/2012  Lee
(Continued)

FOREIGN PATENT DOCUMENTS

CN   106708270 A    5/2017
CN   107977076 B   11/2018
(Continued)

OTHER PUBLICATIONS

International Search Report and Written Opinion dated Jun. 11, 2021 issued in International Patent Application No. PCT/EP2020/074157 (10 pages).
(Continued)

*Primary Examiner* — Jwalant Amin
(74) *Attorney, Agent, or Firm* — Rothwell, Figg, Ernst & Manbeck, P.C.

(57) ABSTRACT

A method for controlling projection of an image in an extended reality device is disclosed. The extended reality device comprising an optical element, a display, and a motion tracker, wherein the optical element and/or the display are mounted movement flexible in the extended reality device. The method comprises obtaining motion information of the extended reality device from the motion tracker; determining a compensating movement of the optical element and/or the display for projection of the image based on the obtained motion information of the extended reality device; and controlling projection of the image by moving the optical element and/or the display based on the determined compensating movement. Corresponding computer program product, apparatus, and extended reality headset are also disclosed.

18 Claims, 4 Drawing Sheets

(51) Int. Cl.
    *G06T 7/20*     (2017.01)
    *G06T 7/70*     (2017.01)
    *G06T 17/00*     (2006.01)

(52) U.S. Cl.
    CPC ............... *G06T 7/70* (2017.01); *G06T 17/00* (2013.01); *G02B 2027/014* (2013.01); *G02B 2027/0187* (2013.01)

(56) References Cited

U.S. PATENT DOCUMENTS

| | | | |
|---|---|---|---|
| 2017/0076425 A1 | 3/2017 | Folse | |
| 2017/0099478 A1 | 4/2017 | Cambridge | |
| 2018/0075653 A1 | 3/2018 | Schillings | |
| 2019/0066353 A1 | 2/2019 | Anderson et al. | |
| 2019/0302883 A1 | 10/2019 | Greer et al. | |
| 2023/0039100 A1* | 2/2023 | Melkote Krishnaprasad | ............... G02B 27/0093 |

FOREIGN PATENT DOCUMENTS

| | | |
|---|---|---|
| CN | 106708270 B | 9/2020 |
| WO | 2016164207 A1 | 10/2016 |
| WO | 2016180702 A1 | 11/2016 |
| WO | 2019089283 A1 | 5/2019 |
| WO | 2019143688 A1 | 7/2019 |

OTHER PUBLICATIONS

International Preliminary Report on Patentability dated Feb. 28, 2023 issued in International Patent Application No. PCT/EP2020/074157 (7 pages).

Dick Burbidge et al., "Hardware Improvements to the Helmet Mounted Projector on the Visual Display Research Tool (VDRT) at the Naval Training Systems Center", SPIE vol. 1116 Helmet-Mounted Displays, Jan. 1, 1989, XP055150422, http://proceedings.spiedigitallibrary.org/ (9 pages).

* cited by examiner

PROJECTION OF AN IMAGE IN AN EXTENDED REALITY DEVICE

CROSS REFERENCE TO RELATED APPLICATIONS

This application is a 35 U.S.C. § 371 National Stage of International Patent Application No. PCT/EP2020/074157, filed Aug. 28, 2020.

TECHNICAL FIELD

The present disclosure relates generally to the field of extended reality. More particularly, it relates to projection of an image in an extended reality device.

BACKGROUND

Typically in an extended reality device, an extended reality environment, e.g., a virtual reality scene, is rendered with a projected, i.e., guessed, position and direction of the viewer's eyes.

One example of projection comprises asynchronous reprojection.

Asynchronous reprojection in prior art is limited to operate within a frame rate of a display in the extended reality device as well as controlling circuitry for rendering the extended reality environment.

A first drawback of asynchronous reprojection in prior art is perceived latency and lag in the rendering of the extended reality environment due to the frame rate and/or the controlling circuitry.

A second drawback of asynchronous reprojection in prior art is interruptions in the rendering of the extended reality environment due to the frame rate and/or the controlling circuitry.

Therefore, there is a need for alternative approaches for projection of images in extended reality devices.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an apparatus is referred to herein, it is to be understood as a physical product. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for controlling projection of an image in an extended reality device comprising an optical element, a display, and a motion tracker, wherein the optical element and/or the display are mounted movement flexible in the extended reality device.

The method comprises obtaining motion information of the extended reality device from the motion tracker, and determining a compensating movement of the optical element and/or the display for projection of the image based on the obtained motion information of the extended reality device.

The method further comprises controlling projection of the image by moving the optical element and/or the display based on the determined compensating movement.

In some embodiments, the method further comprises obtaining position information for the image to be displayed from controlling circuitry operably connected to the extended reality device, obtaining timing information for when the image is to be displayed from controlling circuitry operably connected to the extended reality device, and displaying the image based on the obtained position information and the obtained timing information.

In some embodiments, obtaining virtual motion information of objects in an extended reality environment from controlling circuitry operably connected to the extended reality device, and determining the compensating movement of the optical element and/or the display for projection of the image based on the obtained virtual motion information of the objects in the extended reality environment.

In some embodiments, the motion information of the extended reality device comprises position and/or movement information.

In some embodiments, the virtual motion information of objects in the extended reality environment comprises virtual position and/or virtual movement information.

In some embodiments, the controlling of projection of the image comprises mechanically moving the optical element and/or the display based on the determined compensating movement.

In some embodiments, any one of obtaining motion information, obtaining virtual motion information, determining a compensating movement based on the obtained motion information and/or the virtual motion information, and controlling projection based on the determined compensating movement is performed continuously for controlling projection of the image continuously in the extended reality device.

In some embodiments, the projection comprises an asynchronous reprojection.

In some embodiments, the asynchronous reprojection comprises an extended reality scene.

In some embodiments, the extended reality scene is rendered with a projected and predicted position and direction of a viewer's eyes.

In some embodiments, the projected position and direction are compared to the actual locations and compensated for.

In some embodiments, the method further comprises resetting the optical element and/or the display to a start position for displaying a next image.

In some embodiments, the resetting the display comprises resetting a display illumination.

In some embodiments, the motion tracker comprises an inertial measurement unit.

In some embodiments, the optical element comprises an array of one or more optical elements.

In some embodiments, the compensating movement of the optical element and/or the display compensates for any one of six axis of movement: X, Y, Z, Roll, Yaw, and Pitch.

In some embodiments, the device is configured to be mounted on a viewer's head.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for controlling projection of an image in an extended reality device, wherein the extended reality device comprises an optical element, a display, and a motion tracker, and wherein the optical element and/or the display are mounted movement flexible in the extended reality device.

The apparatus comprises a controller configured to cause obtainment of motion information of the extended reality device from the motion tracker, and determination of a compensating movement of the optical element and/or the display for projection of the image based on the obtained motion information of the extended reality device.

The controller is further configured to cause control of projection of the image by movement of the optical element and/or the display based on the determined compensating movement.

In some embodiments, the controller is further configured to cause obtainment of position information for the image to be displayed from controlling circuitry operably connected to the extended reality device, obtainment of timing information for when the image is to be displayed from controlling circuitry operably connected to the extended reality device, and display of the image based on the obtained position information and the timing information.

In some embodiments, the controller is further configured to cause obtainment of virtual motion information of objects in an extended reality environment from controlling circuitry operably connected to the extended reality device, and determination of the compensating movement of the optical element and/or the display for projection of the image based on the obtained virtual motion information of the objects in the an extended reality environment.

In some embodiments, the motion information of the extended reality device comprises position and/or movement information.

In some embodiments, the virtual motion information of objects in the extended reality environment comprises virtual position and/or virtual movement information.

In some embodiments, the control of projection of the image comprises mechanical control by movement of the optical element and/or the display based on the determined compensating movement.

In some embodiments, any one action caused by the controller is performed continuously for controlling projection of the image continuously in the extended reality device.

In some embodiments, the projection comprises an asynchronous reprojection.

In some embodiments, the asynchronous reprojection comprises an extended reality scene.

In some embodiments, the extended reality scene is rendered with a projected and predicted position and direction of a viewer's eyes.

In some embodiments, the projected position and direction are compared to the actual locations and compensated for.

In some embodiments, the controller is further configured to cause reset of the optical element and/or the display to a start position for displaying a next image.

In some embodiments, reset of the display comprises reset of a display illumination.

In some embodiments, the motion tracker comprises an inertial measurement unit.

In some embodiments, the optical element comprises an array of one or more optical elements.

In some embodiments, the compensating movement of the optical element and/or the display compensates for any one of six axis of movement: X, Y, Z, Roll, Yaw, and Pitch.

In some embodiments, the extended reality device is configured to be mounted on a viewer's head.

In some embodiments, actuators are arranged on the optical element and/or the display for the mechanical control.

A fourth aspect is an extended reality headset comprising the apparatus according to the third aspect.

In some embodiments, the extended reality device is operably connected to controlling circuitry.

In some embodiments, the controlling circuitry comprises a Central Processing Unit, CPU, and/or a Graphics Processing Unit, GPU.

Any of the above aspects may additionally have features identical with or corresponding to any of the various features as explained above for any of the other aspects.

An advantage of some embodiments is that alternative approaches for projection of images in extended reality devices are provided.

An advantage of some embodiments is that perceived latency and lag is an extended reality device are reduced manyfold.

An advantage of some embodiments is that interruptions in rendering of an extended reality environment in an extended reality device is reduced manyfold.

An advantage of some embodiments is that responsiveness is improved since the reprojection is performed in an analog domain in contrast to a digital domain, wherein the digital domain only comprises changing contents on a display.

An advantage of some embodiments is that less capable (e.g., cheaper) graphics controlling circuitry may be utilized for extended reality applications.

An advantage of some embodiments is that motion sickness or nausea caused by visual stimulus and not corresponding to felt motion will be reduced, thus making longer extended reality sessions feasible.

It should be noted that, even if embodiments are described herein in the context of extended reality, some embodiments may be equally applicable and/or beneficial also in other contexts.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, asynchronous reprojection in prior art is limited to operate within a frame rate of the display used as well as controlling circuitry for rendering the extended reality environment.

Typically, frame rates for displays may be in the range of 72 frames per second (fps) to 144 fps.

Typically, controlling circuitry for rendering extended reality environments may comprise one or more Graphics Processing Units (GPU) and/or one or more Central Processing Units (CPU).

For example, the GPU may be used for asynchronous reprojection and simultaneously be used for rendering later frames, which leads to interruptions in the rendering pipeline.

Typically, latencies with GPU-based asynchronous reprojection from input stimulus to display output may be in the range of 2 milliseconds (ms) and without GPU-based asynchronous reprojection, latencies may be in the range of 2-3 pipeline stages, corresponding to 13-41 ms.

Generally, even if exemplification is made using a context of extended reality, it should be noted that some embodiments are equally applicable in other contexts, e.g., augmented reality, and virtual reality.

In the following, embodiments will be presented where alternative approaches for projection of images in extended reality devices are described.

Extended reality device, as described herein, may typically comprise a device configured to render any one of extended reality (XR) environments, augmented reality (AR) environments, and virtual reality (VR) environments.

Alternatively or additionally, an extended reality device, as described herein, may typically comprise a device configured to perform any one of asynchronous reprojection, asynchronous spacewarp, and motion smoothing.

For example, an extended reality device may be an extended reality device headset mountable on a viewer's (i.e., a user) head, wherein the extended reality device headset comprises an optical element, a display, and a motion tracker, and wherein the optical element and/or the display are mounted movement flexible.

Movement flexible, as described herein, may typically comprise one or more components of an extended reality device being mounted such in the extended reality device that they are physically movable in one or more degrees of freedom by, e.g., actuators, and wherein the one or more components may comprise optical elements and/or display of the extended reality device.

Projection, as described herein, may typically comprise projection of one or more images to render an extended reality environment, e.g., a virtual reality scene, comprising virtual objects. Asynchronous reprojection, as described herein, may typically comprise a class of motion interpolation methods for ensuring responsiveness of an extended reality device, e.g., a headset, to motion, e.g., head motion.

It should be noted that, even if embodiments are described herein in the context of extended reality, some embodiments may be equally applicable and/or beneficial also in other contexts such as of augmented reality, and virtual reality.

Figure 1:
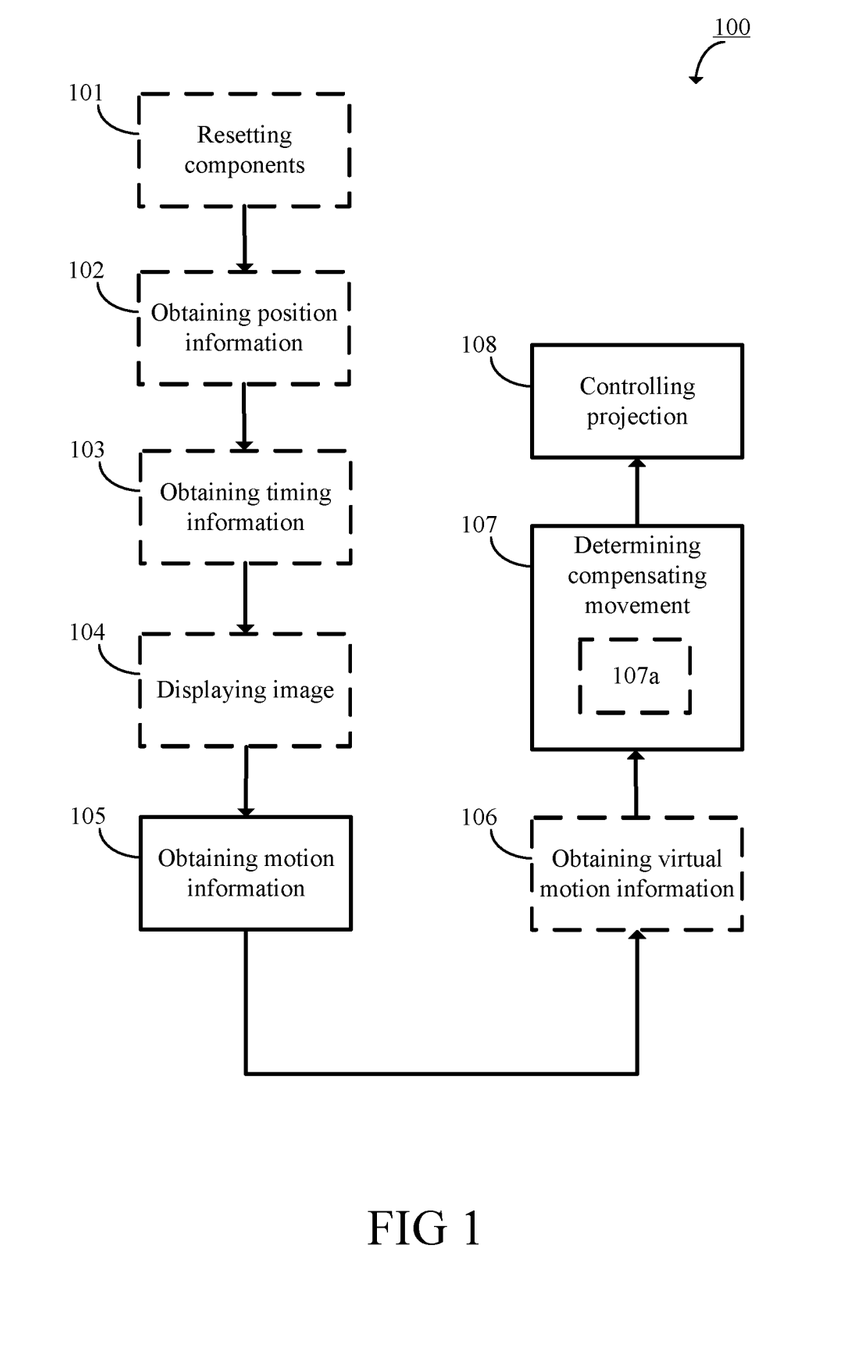
FIG. 1 is a flowchart illustrating example method steps according to some embodiments.

FIG. 1 is a flowchart illustrating method steps of an example method 100 according to some embodiments. The method 100 is for controlling projection of an image in an extended reality device. Thus, the method 100 (or steps thereof) may, for example, be performed by apparatus 400 and/or controller 410 of FIG. 4 and/or controlling circuitry of FIG. 3 and/or apparatus 200 of FIG. 2; of which will be described later herein.

The method 100 comprises the following steps.

In optional step 101, in some embodiments, the optical element and/or the display is reset to a start position for displaying a next image.

In some embodiments, the optical element comprises one or more lenses configured to bend the light enabling the user to correctly see images generated on the display.

For example, the optical lenses may bend the light such that the images on the display are perceived farther away than the really are.

In some embodiments, the optical element comprises one or more mirrors configured to reflect the light enabling the user to correctly see images generated on the display.

For example, the mirrors may reflect the light such that the images on the display are perceived distorted, magnified, or reduced in various ways.

In some embodiments, the display comprises a DLP display.

In optional step 102, in some embodiments, position information for the image to be displayed is obtained from controlling circuitry operably connected to the extended reality device.

In some embodiments, the controlling circuitry comprises a CPU.

For example, the CPU may be configured to determine at which coordinates the image is to be displayed.

Alternatively or additionally, the CPU may be configured to instruct other controlling circuitry to process image creation.

In optional step 103, in some embodiments, timing information for when the image is to be displayed is obtained from controlling circuitry operably connected to the extended reality device.

In some embodiments, the controlling circuitry comprises a GPU.

For example, the GPU may be configured to accelerate creation of the image in a frame buffer intended for output to a display.

Alternatively or additionally, the accelerated creation of the image by the GPU is performed in parallel to determining the coordinates of the created image by the CPU.

In optional step 104, in some embodiments, the image is displayed based on the obtained position information and the obtained timing information.

For example, the image is displayed at the coordinates determined by the CPU when the GPU has completed the creation of the image.

Alternatively or additionally, the GPU may inform the CPU when the creation of the image has been completed.

In step 105, motion information of the extended reality device is obtained from the motion tracker.

In some embodiments, the motion information of the extended reality device comprises position and/or movement information.

For example, the position and/or movement information may comprise information indicative of the position and/or movement (i.e., change of position) of an extended reality device mounted on a viewer's head.

For example, the information indicative of the position and/or movement the extended reality device may indicate a motion performed by the viewer (i.e., the user) and/or angle or position of the viewer's head and/or eyes.

For example, the extended reality device may comprise an extended reality device headset.

Alternatively or additionally, step 105 is performed continuously for controlling projection of the image continuously in the extended reality device.

In optional step 106, in some embodiments, virtual motion information of objects in an extended reality environment is obtained from controlling circuitry operably connected to the extended reality device.

In some embodiments, the virtual motion information of objects in the extended reality environment comprises virtual position and/or virtual movement information.

For example, the virtual motion information may comprise information indicative of the virtual position and/or movement of objects, i.e., perceived objects, in the extended reality environment, e.g., a virtual scene.

For example, objects in the extended reality environment may comprise non-real objects or characters, i.e., objects or characters which are not present in the physical environment, e.g., in virtual reality, and/or a combination of real objects and non-real objects, e.g., in augmented reality.

Alternatively or additionally, step 106 is performed continuously for controlling projection of the image continuously in the extended reality device.

In step 107, a compensating movement of the optical element and/or the display for projection of the image is determined based on the obtained motion information of the extended reality device (according to step 105).

Alternatively or additionally, step 107 is performed continuously for controlling projection of the image continuously in the extended reality device.

In optional step 107a, in some embodiments, the compensating movement of the optical element and/or the display is determined for projection of the image further based on the obtained virtual motion information of the objects in the extended reality environment.

Alternatively or additionally, step 107a is performed continuously for controlling projection of the image continuously in the extended reality device.

In step 108, projection of the image is controlled by moving the optical element and/or the display based on the determined compensating movement.

In some embodiments, controlling the projection of the image comprises mechanically moving the optical element and/or the display based on the determined compensating movement.

For example, actuators may be arranged on the optical element and/or the display for the mechanical control, wherein the mechanical control may generate a movement of the optical element and/or the display in one or more degrees of freedom.

Alternatively or additionally, step 108 is performed continuously for controlling projection of the image continuously in the extended reality device.

Any of the above steps for FIG. 1 may additionally have features which are identical with or corresponding to any of the various features as explained below for FIGS. 2-5 as suitable.

Figure 2:
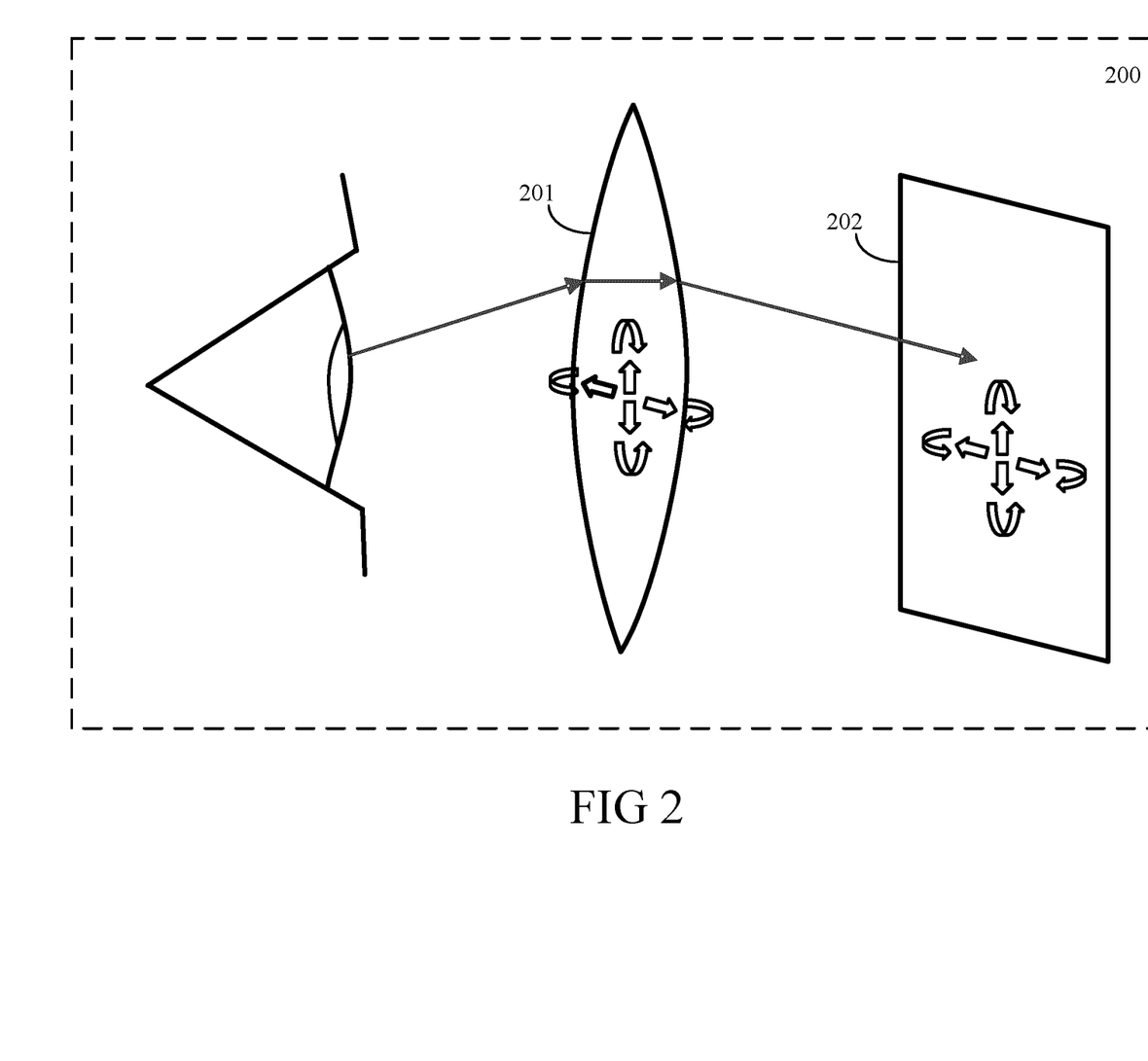
FIG. 2 is a schematic drawing illustrating an example apparatus according to some embodiments.

FIG. 2 is a schematic drawing illustrating an example apparatus 200 according to some embodiments. The apparatus 200 is for controlling projection of an image in an extended reality device. Thus, the apparatus 200 (or components thereof) may, for example, be configured to perform one or more method steps of FIG. 1 and/or one or more steps otherwise described herein.

FIG. 2 illustrates the apparatus 200 comprising an implementation for mechanically controlling projection of one or more images in an extended reality device.

The apparatus 200, e.g., a XR headset, comprises an optical element 201 and a display 202 mounted inside the apparatus 200.

In some embodiments, the optical element 201 may be mounted flexible to allow movement of the optical element 201, e.g., via actuators in the XR headset.

In some embodiments, the display 202 may be mounted flexible to allow movement of the display 202, e.g., via actuators in the XR headset.

In some embodiments, the optical element 201 and/or the display 202 may be mounted flexible to allow movement of the optical element 201 and/or the display 202, e.g., via actuators in the XR headset.

The movement of the optical element 201 and/or the display 202 may be performed in one or more degrees of freedom.

For example, the degrees of freedom may comprise any one of six axis of movement: X, Y, Z, Roll, Yaw, and Pitch, i.e., six degrees of freedom (6DoF).

The movement flexible implementation of the optical element 201 and/or the display 202 in the apparatus 200 may enable compensating movements of the optical element 201 and/or the display 202, wherein the compensating movements enable faster correction of visual stimulus.

By ensuring responsiveness of the apparatus 200 with a mechanical approach to projection, e.g., asynchronous reprojection, prolonged sessions in extended reality are enabled due to faster correction of visual stimulus.

Figure 3:
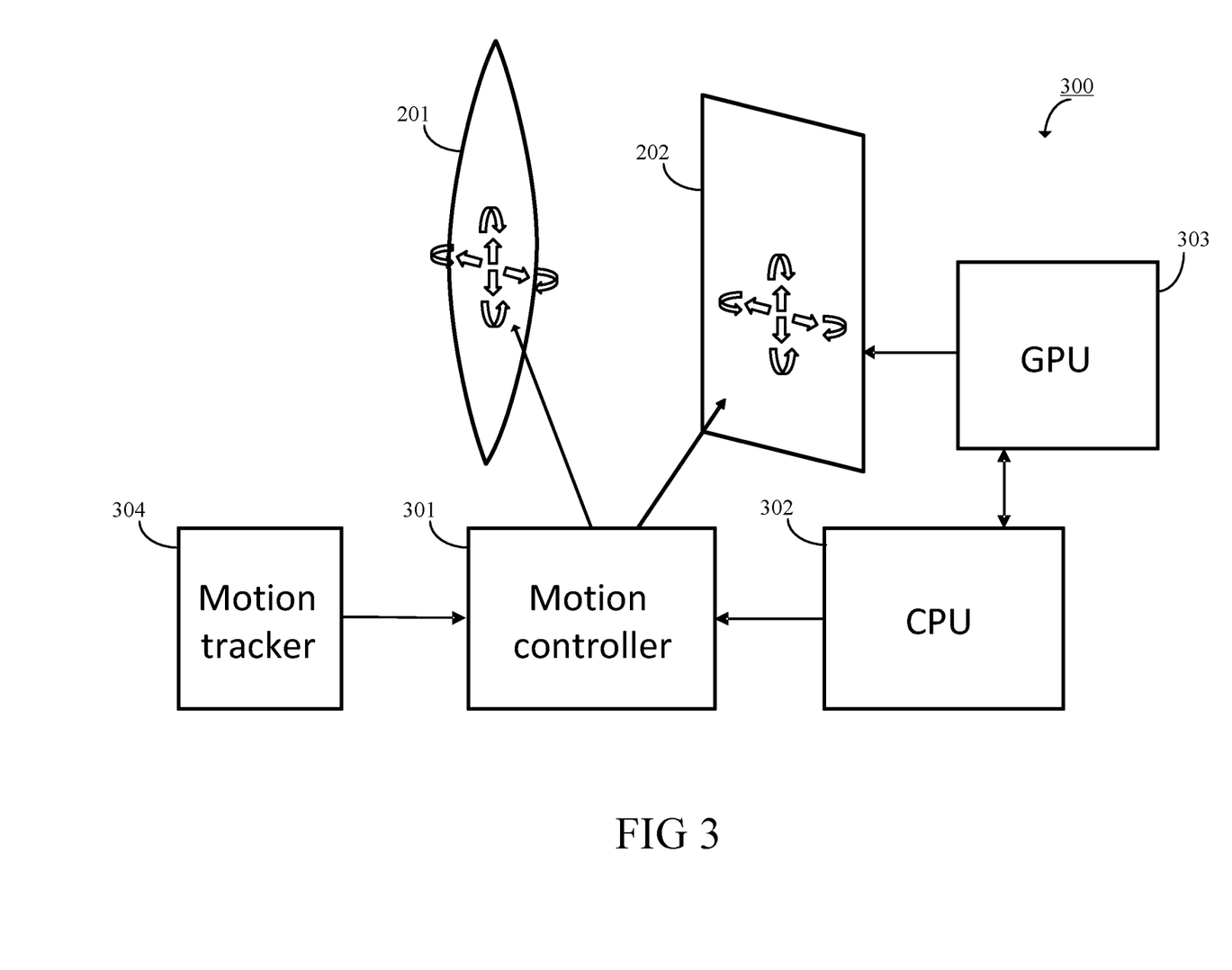
FIG. 3 is a schematic drawing illustrating example controlling circuitry according to some embodiments.

FIG. 3 is a schematic drawing illustrating example controlling circuitry 300 according to some embodiments. The controlling circuitry 300 is for controlling projection of an image in an extended reality device. Thus, the controlling circuitry 300 (or components thereof) may, for example, be configured to perform one or more method steps of FIG. 1 and/or one or more steps otherwise described herein.

FIG. 3 illustrates controlling circuitry 300 operably connected to movement flexible components 201 and 202 as described above in FIG. 2. The controlling circuitry 300 comprises a motion controller 301, a CPU 302, one or more GPUs 303, and a motion tracker 304.

The controlling circuitry 300 in FIG. 3 is configured for projection, e.g., asynchronous reprojection, wherein the asynchronous reprojection ensures responsiveness of an extended reality device, e.g., a headset, to motion, e.g., head motion, regardless of frame rate and type of controlling circuitry, e.g., a render pipeline's depth.

By physically, i.e., mechanically, moving the movement flexible components 201 and/or 202, reprojection may be performed continuously in correspondence to the user's eye/head/character movements and potentially combined with expected movements in the virtual world.

The mechanical reprojection, as described herein, is configured for looking into the optical elements towards the display in contrast to a digital single-lens reflex camera (DLSR), wherein light rays enter the optical elements towards the image sensor.

The mechanical reprojection is reset at the arrival of a new computed frame to the current difference between projected position and direction of the eye, and the extended reality device is then constantly motion tracked in order to determine the needed movements of the optical element 201 and/or the display 202 to smoothly reproject the shown image in the display 202 to the user. The mechanical reprojection makes the responsiveness less affected by frame rates and digital compute power.

The motion controller 301 receives position and movement of a user from a motion tracker 304, e.g. an inertial measurement unit (IMU), and sends control signals for physically moving the optical element 201 and/or the display 202 in the extended reality device.

The motion controller 301 also receives timing information from the CPU regarding when a new image is shown on the display, together with its projected position and direction that were used at the initiation of the rendering pipeline, as well as the GPU-based asynchronous reprojection done to this image.

Whenever a new image is sent to the display 202 and the physical locations of the optical element 201 and the display 202 needs to be reset, the back light of the display could briefly be turned off while the mechanical movement of the optical element 201 and display 202 is in progress.

Hence, when rendering of the virtual reality scene is completed, the projected position and direction are compared, and compensated for to the actual locations.

Figure 4:
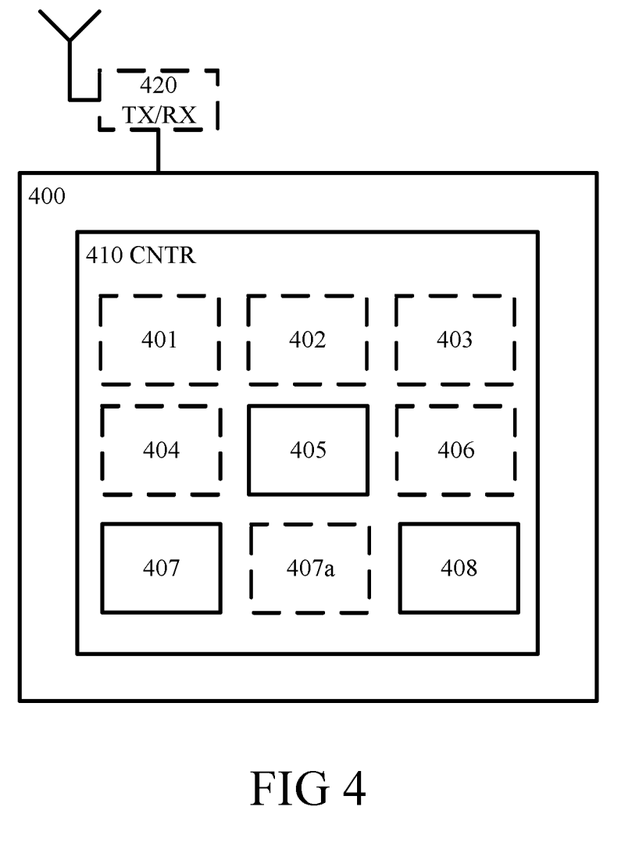
FIG. 4 is a schematic block diagram illustrating an example apparatus according to some embodiments.

FIG. 4 is a schematic block diagram illustrating an example apparatus 400 according to some embodiments. The apparatus 400 is for controlling projection of an image in an extended reality device. Thus, the apparatus 400 and/or the controller 410 may, for example, perform one or more method steps of FIG. 1 and/or one or more steps otherwise described herein.

The extended reality device may comprise an optical element 201 and a display 202 which are mounted movement flexible as illustrated and described in connection with FIG. 2.

The extended reality device may be operably connected to controlling circuitry, e.g. a motion tracker 304 as illustrated and described in connection with FIG. 3 and be configured to track position and/or movements of a user wearing the extended reality device.

The apparatus 400 comprises a controller 410 configured to cause obtainment of motion information of the extended reality device from the motion tracker 304, and determination of a compensating movement of the optical element 201 and/or the display 202 for projection of the image based on the obtained motion information of the extended reality device.

The controller 410 is further configured to cause control of projection of the image by movement of the optical element 201 and/or the display 202 based on the determined compensating movement.

In some embodiments, the controller 410 is furthermore configured to cause obtainment of position information for the image to be displayed from controlling circuitry 304 operably connected to the extended reality device, obtainment of timing information 303 for when the image is to be displayed from controlling circuitry operably connected to the extended reality device, and display of the image based on the obtained position information and the timing information.

In some embodiments, the controller 410 is furthermore configured to cause obtainment of virtual motion information of objects in an extended reality environment from controlling circuitry operably 302 connected to the extended reality device, and determination of the compensating movement of the optical element 201 and/or the display 202 for projection of the image based on the obtained virtual motion information of the objects in the extended reality environment.

In some embodiments, the controller 410 is furthermore configured to cause reset of the optical element 201 and/or the display 202 to a start position for displaying a next image.

The apparatus 400 may, as mentioned above, comprise the controller 410 (CNTR; e.g., control circuitry or a controlling module), which may in turn comprise, (or be otherwise associated with; e.g., connected or connectable to), an obtainer 405, e.g., obtaining circuitry or obtaining module, configured to obtain motion information of the extended reality device from the motion tracker (compare with step 105 of FIG. 1 and 304 of FIG. 3).

The controller 410 further comprises, (or is otherwise associated with; e.g., connected or connectable to), a determiner 407, e.g., determining circuitry or determining module, configured to determine a compensating movement of the optical element and/or the display for projection of the image based on the obtained motion information of the extended reality device (compare with step 107 of FIG. 1 and 301 of FIG. 3).

The controller 410 further comprises, (or is otherwise associated with; e.g., connected or connectable to), a controller 408, e.g., controlling circuitry or controlling module, configured to control projection of the image by moving the optical element and/or the display based on the determined compensating movement (compare with step 108 of FIG. 1 and 301 of FIG. 3).

In some embodiments, the control of projection of the image comprises mechanical control by movement of the optical element and/or the display based on the determined compensating movement.

In some embodiments, the controller 410 furthermore comprises, (or is otherwise associated with; e.g., connected or connectable to), a resetter 401, e.g., resetting circuitry or resetting module, configured to reset the optical element and/or the display to a start position for displaying a next image (compare with step 101 of FIG. 1 and 301 of FIG. 3).

In some embodiments, the controller 410 furthermore comprises, (or is otherwise associated with; e.g., connected or connectable to), an obtainer 402, e.g., obtaining circuitry or obtaining module, configured to obtain position information for the image to be displayed from controlling circuitry operably connected to the extended reality device (compare with step 102 of FIG. 1 and 302 of FIG. 3).

In some embodiments, the controller 410 furthermore comprises, (or is otherwise associated with; e.g., connected or connectable to), an obtainer 403, e.g., obtaining circuitry or obtaining module, configured to obtain timing information for when the image is to be displayed from controlling circuitry operably connected to the extended reality device (compare with step 103 of FIG. 1 and 302 of FIG. 3).

In some embodiments, the controller 410 furthermore comprises, (or is otherwise associated with; e.g., connected or connectable to), a displayer 404, e.g., displaying circuitry or displaying module, configured to display the image based on the obtained position information and the obtained timing information (compare with step 104 of FIG. 1 and 202 of FIGS. 2 and 3).

In some embodiments, the controller 410 furthermore comprises, (or is otherwise associated with; e.g., connected or connectable to), an obtainer 406, e.g., obtaining circuitry or obtaining module, configured to obtain virtual motion information of objects in an extended reality environment from controlling circuitry operably connected to the extended reality device (compare with step 106 of FIG. 1 and 302 of FIG. 2).

In some embodiments, the controller 410 furthermore comprises, (or is otherwise associated with; e.g., connected or connectable to), a determiner 407*a*, e.g., determining circuitry or determining module, configured to determine the compensating movement of the optical element and/or the display for projection of the image based on the obtained virtual motion information of the objects in the extended reality environment (compare with step 107*a* of FIG. 1 and 301 of FIG. 3).

In some embodiments, the controller 410 furthermore comprises, (or is otherwise associated with; e.g., connected or connectable to), a transceiver TX/RX 420, e.g., transceiving circuitry or transceiving module, configured to transmit and receive information related to an extended reality environment in a wireless communication network.

In some embodiments, the apparatus 400 and/or the controller 410 is completely or partially comprised in an extended reality device.

In some embodiments, the apparatus 400 and/or the controller 410 is completely or partially comprised in in a cloud environment.

Generally, when an apparatus is referred to herein, it is to be understood as a physical product. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), Graphics Processing Units (GPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a program memory.

Figure 5:
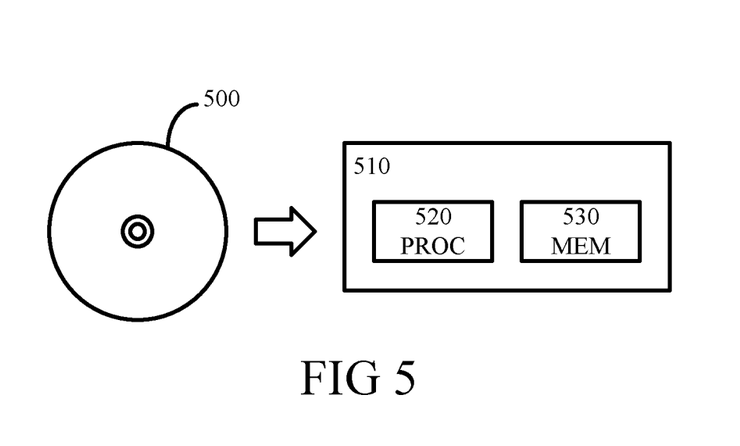
FIG. 5 is a schematic drawing illustrating an example computer readable medium according to some embodiments.

FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device 810. When loaded into the data processor, the computer program may be stored in a memory (MEM) 530 associated with or comprised in the data processor.

In some embodiments, the computer program may, when loaded into and run by the data processing unit, cause execution of one or more method steps according to, for example, FIG. 1 and/or one or more of any steps otherwise described herein.

In some embodiments, the computer program may, when loaded into and run by the data processing unit, cause execution of steps according to, for example, FIG. 1 and/or one or more of any steps otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for controlling projection of an image in an extended reality device comprising an optical element, a display, and a motion tracker, wherein the optical element and/or the display are mounted movement flexible in the extended reality device, the method comprising the steps of:
    obtaining motion information of the extended reality device from the motion tracker;
    determining a compensating movement of the optical element and/or the display for projection of the image based on the obtained motion information of the extended reality device; and
    controlling projection of the image by moving the optical element and/or the display based on the determined compensating movement, wherein
    the projection comprises an extended reality scene,
    the extended reality scene is rendered with a projected position and direction of a viewer's eyes, and
    the projected position and direction are compared to the obtained motion information and compensated for.

2. A computer program product comprising a non-transitory computer readable medium, having thereon a computer program comprising program instructions, the computer program being loadable into a data processing unit and configured to cause execution of the method of claim 1 when the computer program is run by the data processing unit.

3. An apparatus for controlling projection of an image in an extended reality device, wherein the extended reality device comprises an optical element, a display, and a motion tracker, and wherein the optical element and/or the display are mounted movement flexible in the extended reality device, the apparatus comprising:

a controller comprising a processor configured to cause the apparatus to:

obtain motion information of the extended reality device from the motion tracker;

determine a compensating movement of the optical element and/or the display for projection of the image based on the obtained motion information of the extended reality device; and control projection of the image by movement of the optical element and/or the display based on the determined compensating movement, wherein the projection comprises an extended reality scene, the extended reality scene is rendered with a projected position and direction of a viewer's eyes, and the projected position and direction are compared to the obtained motion information and compensated for.

4. The apparatus of claim 3, the controller being further configured to cause:

obtainment of position information for the image to be displayed from controlling circuitry operably connected to the extended reality device;

obtainment of timing information for when the image is to be displayed from controlling circuitry operably connected to the extended reality device; and display of the image based on the obtained position information and the timing information.

5. The apparatus of claim 3, the controller being further configured to cause:

obtainment of virtual motion information of objects in an extended reality environment from controlling circuitry operably connected to the extended reality device; and determination of the compensating movement of the optical element and/or the display for projection of the image based on the obtained virtual motion information of the objects in the extended reality environment.

6. The apparatus of claim 5, wherein the virtual motion information of objects in the extended reality environment comprises virtual position and/or virtual movement information.

7. The apparatus of claim 3, wherein the motion information of the extended reality device comprises position and/or movement information.

8. The apparatus of claim 3, wherein the control of projection of the image comprises mechanical control by movement of the optical element and/or the display based on the determined compensating movement.

9. The apparatus of claim 3, wherein any one action caused by the controller is performed continuously for controlling projection of the image continuously in the extended reality device.

10. The apparatus of claim 3, wherein the projection comprises an asynchronous reprojection.

11. The apparatus of claim 3, the controller being further configured to cause:

reset of the optical element and/or the display to a start position for displaying a next image.

12. The apparatus of claim 11, wherein reset of the display comprises reset of a display illumination.

13. The apparatus of claim 3, wherein the motion tracker comprises an inertial measurement unit.

14. The apparatus of claim 3, wherein the optical element comprises an array of one or more optical elements.

15. The apparatus of claim 3, wherein the compensating movement of the optical element and/or the display compensates for any one of six axis of movement: X, Y, Z, Roll, Yaw, and Pitch.

16. The apparatus of claim 3, wherein the extended reality device is configured to be mounted on a viewer's head.

17. The apparatus of claim 3, wherein actuators are arranged on the optical element and/or the display for the mechanical control.

18. An extended reality headset comprising the apparatus of claim 3.

* * * * *